United States Patent
Regan et al.

(10) Patent No.: US 9,937,627 B2
(45) Date of Patent: Apr. 10, 2018

(54) MANUFACTURING VACUUM TOOL WITH SELECTIVE ACTIVATION OF PICKUP ZONES

(71) Applicant: NIKE, Inc., Beaverton, OR (US)

(72) Inventors: Patrick Conall Regan, Singapore (SG); Kuo-Hung Lee, Douliu (TW); Chih-Chi Chang, Douliu (TW)

(73) Assignee: NIKE, Inc., Beaverton, OR (US)

( * ) Notice: Subject to any disclaimer, the term of this patent is extended or adjusted under 35 U.S.C. 154(b) by 35 days.

(21) Appl. No.: 15/220,063

(22) Filed: Jul. 26, 2016

(65) Prior Publication Data
US 2016/0332310 A1    Nov. 17, 2016

Related U.S. Application Data

(63) Continuation of application No. 14/978,253, filed on Dec. 22, 2015, now Pat. No. 9,403,280, which is a
(Continued)

(51) Int. Cl.
*B66C 1/02* (2006.01)
*B25J 15/06* (2006.01)
(Continued)

(52) U.S. Cl.
CPC .......... *B25J 15/0616* (2013.01); *A43D 11/00* (2013.01); *B25B 11/005* (2013.01); *B25B 11/007* (2013.01); *B25J 15/0061* (2013.01); *B25J 15/0675* (2013.01); *B25J 15/0691* (2013.01); *B29C 65/08* (2013.01);
(Continued)

(58) Field of Classification Search
CPC .......... B25J 15/0616; B25J 15/0061; B25J 15/0675; B25J 15/0691; H01L 21/6838; B65G 47/91; Y10S 901/40; B25B 11/007; B25B 11/005; Y10T 29/494; Y10T 29/49716; A43D 11/00; B29C 65/08; B29C 65/7847; B29C 66/863; B29L 2031/505
USPC ................ 294/185, 65, 186, 188, 183, 64.2; 901/40; 414/627, 737
See application file for complete search history.

(56) References Cited

U.S. PATENT DOCUMENTS

| | | | |
|---|---|---|---|
| 949,850 | A | 2/1910 | Smith |
| 2,572,640 | A | 10/1951 | Lovegrove |

(Continued)

FOREIGN PATENT DOCUMENTS

| | | |
|---|---|---|
| CH | 687366 A5 | 11/1996 |
| CN | 201064906 Y | 5/2008 |

(Continued)

OTHER PUBLICATIONS

European Search Report and Written Opinion dated Mar. 7, 2017 for European Patent Application No. 12850394.3, 11 pages.
(Continued)

*Primary Examiner* — Gabriela M Puig
(74) *Attorney, Agent, or Firm* — Shook, Hardy & Bacon L.L.P.

(57) ABSTRACT

The present invention provides systems, methods, and apparatus for a vacuum tool having a switchable plate, such that a common vacuum tool may be adapted with different plates. A switchable plate may form the entirety of the vacuum tool's material contacting surface or a switchable plate may form a portion of the material contacting surface. The vacuum tool is effective for picking and placing one or more manufacturing parts utilizing a vacuum force.

20 Claims, 9 Drawing Sheets

Related U.S. Application Data continuation of application No. 14/661,565, filed on Mar. 18, 2015, now Pat. No. 9,238,305, which is a continuation of application No. 13/421,525, filed on Mar. 15, 2012, now Pat. No. 9,010,827, which is a continuation-in-part of application No. 13/299,934, filed on Nov. 18, 2011, now abandoned.

(51) Int. Cl.

| | | |
|---|---|---|
| *B25B 11/00* | (2006.01) | |
| *B25J 15/00* | (2006.01) | |
| *A43D 11/00* | (2006.01) | |
| B29L 31/50 | (2006.01) | |
| B29C 65/08 | (2006.01) | |
| B29C 65/78 | (2006.01) | |
| B29C 65/00 | (2006.01) | |

(52) U.S. Cl.
CPC ........ *B29C 65/7847* (2013.01); *B29C 66/863* (2013.01); *B29L 2031/505* (2013.01); *Y10T 29/494* (2015.01); *Y10T 29/49716* (2015.01)

(56) References Cited

U.S. PATENT DOCUMENTS

| | | | |
|---|---|---|---|
| 3,183,032 A | 5/1965 | Warfel | |
| 3,220,723 A | 11/1965 | Rabinow | |
| 3,357,091 A | 12/1967 | Reissmueller et al. | |
| 3,464,102 A | 9/1969 | Soloff | |
| 3,848,752 A | 11/1974 | Branch et al. | |
| 3,866,876 A | 2/1975 | Fournier | |
| 4,185,814 A | 1/1980 | Buchmann et al. | |
| 4,389,064 A | 6/1983 | Laverriere | |
| 4,775,290 A | 10/1988 | Brown et al. | |
| 4,865,680 A | 9/1989 | Pierson | |
| 4,865,687 A | 9/1989 | Pierson | |
| 4,909,022 A | 3/1990 | Kubis et al. | |
| 5,024,574 A | 6/1991 | Wilson et al. | |
| 5,050,919 A | 9/1991 | Yakou et al. | |
| 5,264,069 A | 11/1993 | Dietrich et al. | |
| 5,414,617 A | 5/1995 | Pomerleau et al. | |
| 5,427,301 A | 6/1995 | Pham et al. | |
| 5,480,501 A | 1/1996 | Stewart et al. | |
| 5,609,377 A | 3/1997 | Tanaka | |
| 5,655,700 A | 8/1997 | Pha Cuong Van et al. | |
| 5,772,100 A | 6/1998 | Patrikios et al. | |
| 5,897,882 A | 4/1999 | Gonzalez et al. | |
| 6,127,822 A | 10/2000 | Sasahara et al. | |
| 6,238,503 B1 | 5/2001 | Kakehi | |
| 6,533,885 B2 | 3/2003 | Davis et al. | |
| 6,599,381 B2 | 7/2003 | Urlaub et al. | |
| 6,672,576 B1 | 1/2004 | Walker | |
| 6,718,604 B1 | 4/2004 | Taga et al. | |
| 6,823,763 B1 | 11/2004 | Foster et al. | |
| 6,979,032 B2 | 12/2005 | Damhuis | |
| 7,007,942 B1 | 3/2006 | Stearns et al. | |
| 7,296,834 B2 | 11/2007 | Clark et al. | |
| 7,387,627 B2 | 6/2008 | Erb et al. | |
| 7,476,289 B2 | 1/2009 | White | |
| 7,481,472 B2 | 1/2009 | Cawley et al. | |
| 7,717,482 B2 | 5/2010 | Iwasaki | |
| 8,276,959 B2 | 10/2012 | Kim | |
| 8,696,043 B2 | 4/2014 | Regan et al. | |
| 8,858,744 B2 | 10/2014 | Regan et al. | |
| 8,960,745 B2 | 2/2015 | Regan et al. | |
| 9,010,827 B2 | 4/2015 | Regan et al. | |
| 2002/0153735 A1 | 10/2002 | Kress | |
| 2003/0062110 A1 | 4/2003 | Urlaub et al. | |
| 2003/0160084 A1 | 8/2003 | Higashiyama | |
| 2003/0164620 A1 | 9/2003 | Schmalz et al. | |
| 2003/0189114 A1 | 10/2003 | Taylor et al. | |
| 2004/0034963 A1 | 2/2004 | Rogers et al. | |
| 2004/0212205 A1 | 10/2004 | Linker, II et al. | |
| 2005/0050669 A1 | 3/2005 | Castello | |
| 2005/0115014 A1 | 6/2005 | Worwag | |
| 2006/0082172 A1 | 4/2006 | Clark et al. | |
| 2006/0196332 A1 | 9/2006 | Downing et al. | |
| 2007/0228751 A1 | 10/2007 | Viavattine et al. | |
| 2007/0262598 A1 | 11/2007 | Schaaf et al. | |
| 2007/0290517 A1 | 12/2007 | Nagai et al. | |
| 2009/0035407 A1 | 2/2009 | Mattice et al. | |
| 2009/0108053 A1 | 4/2009 | Huddleston | |
| 2009/0121417 A1 | 5/2009 | Nishimura et al. | |
| 2010/0040450 A1 | 2/2010 | Parnell | |
| 2010/0264679 A1 | 10/2010 | Moriya | |
| 2010/0296903 A1 | 11/2010 | Shah et al. | |
| 2010/0320786 A1 | 12/2010 | Ko et al. | |
| 2011/0123359 A1 | 5/2011 | Schaaf | |
| 2011/0232008 A1 | 9/2011 | Crisp | |
| 2011/0254298 A1 | 10/2011 | Lomerson, Jr. | |
| 2011/0278870 A1 | 11/2011 | Omiya et al. | |
| 2012/0126554 A1 | 5/2012 | Becker et al. | |
| 2013/0032981 A1 | 2/2013 | Schaaf | |

FOREIGN PATENT DOCUMENTS

| | | |
|---|---|---|
| CN | 201483812 U | 5/2010 |
| CN | 101801626 A | 8/2010 |
| DE | 2404197 A1 | 7/1975 |
| DE | 3047717 A1 | 7/1982 |
| DE | 3208864 A1 | 9/1983 |
| DE | 3741091 A1 | 6/1989 |
| DE | 3817615 A1 | 8/1989 |
| EP | 0123173 B1 | 3/1988 |
| EP | 0405171 A1 | 1/1991 |
| EP | 0657373 A2 | 6/1995 |
| EP | 0913246 A1 | 5/1999 |
| EP | 1000732 A2 | 5/2000 |
| EP | 0790010 B1 | 4/2001 |
| EP | 1227041 A2 | 7/2002 |
| EP | 1586419 A2 | 10/2005 |
| EP | 2042453 A1 | 4/2009 |
| EP | 2060348 A1 | 5/2009 |
| FR | 2617078 A1 | 12/1988 |
| GB | 1249294 | 10/1971 |
| GB | 1349578 | 4/1974 |
| JP | H03152091 A | 6/1991 |
| JP | H0457724 A | 2/1992 |
| JP | H05111882 A | 5/1993 |
| JP | H05139554 | 6/1993 |
| JP | 2004174685 A | 6/2004 |
| JP | 2005060063 A | 3/2005 |
| JP | 2006346951 A | 12/2006 |
| WO | 9955186 A1 | 11/1999 |
| WO | 2004062842 A1 | 7/2004 |
| WO | 2006054061 A1 | 5/2006 |

OTHER PUBLICATIONS

European Office Action dated Apr. 5, 2017 for European Patent Application No. 12850479.2, 8 pages.
Non-Final Office Action dated Jan. 17, 2017 in U.S. Appl. No. 14/816,967, 6 pages.
Final Office Action dated Aug. 24, 2017 in U.S. Appl. No. 14/816,967, 7 pages.
Office Action dated Aug. 28, 2017 in European Patent Application No. 12849467.1, 8 pages.
Notice of Allowance dated Dec. 12, 2017 in U.S. Appl. No. 14/816,967, 8 pages.
European Search Report dated Oct. 17, 2017 in European Patent Application No. 17001016.9, 8 pages.
European Office Action dated Nov. 22, 2017 in European Patent Application No. 12849800.3, 8 pages.

VACUUM FORCE

MANUFACTURING VACUUM TOOL WITH SELECTIVE ACTIVATION OF PICKUP ZONES

CROSS-REFERENCE TO RELATED APPLICATIONS

This application is a continuation of U.S. patent application Ser. No. 14/978,253, filed Dec. 22, 2015, titled "MANUFACTURING VACUUM TOOL," which is a continuation of U.S. patent application Ser. No. 14/661,565, filed Mar. 18, 2015, titled "SWITCHABLE PLATE MANUFACTURING VACUUM TOOL" which issued on Jan. 19, 2016, as U.S. Pat. No. 9,238,305, which is a continuation of U.S. patent application Ser. No. 13/421,525, filed Mar. 15, 2012, titled "SWITCHABLE PLATE MANUFACTURING VACUUM TOOL," which issued on Apr. 21, 2015, as U.S. Pat. No. 9,010,827, which is a continuation-in-part of U.S. patent application Ser. No. 13/299,934, filed Nov. 18, 2011, titled "MANUFACTURING VACUUM TOOL." This application is also related by subject matter to (1) U.S. patent application Ser. No. 13/299,908, filed Nov. 18, 2011, titled "MULTI-FUNCTIONAL MANUFACTURING TOOL" and (2) U.S. patent application Ser. No. 13/421,521, titled "ZONED ACTIVATION MANUFACTURING VACUUM TOOL." These referenced priority and related applications are incorporated herein by reference in their entirety.

BACKGROUND

Traditionally, parts used in manufacturing a product are picked up and placed in a position for manufacturing by human hand or robotic means. However, current robotic means have not provided a level of control, dexterity, and effectiveness to be cost-effectively implemented in some manufacturing systems.

SUMMARY

Aspects of the present invention relate to systems, methods, and apparatus for a vacuum tool having a switchable plate, such that a common vacuum tool may be adapted with different plates. A switchable plate may form the entirety of the vacuum tool's material contacting surface or a switchable plate may form a portion of the material contacting surface. The vacuum tool is effective for picking and placing one or more manufacturing parts utilizing a vacuum force.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems, methods, and apparatus for a vacuum tool having a switchable plate, such that a common vacuum tool may be adapted with different plates. A switchable plate may form the entirety of the vacuum tool's material contacting surface or a switchable plate may form a portion of the material contacting surface. The vacuum tool is effective for picking and placing one or more manufacturing parts utilizing a vacuum force.

Accordingly, in one aspect, the present invention provides a vacuum tool comprised of a switchable plate that serves as a material contacting surface. The vacuum tool is comprised of a vacuum distributor. The vacuum distributor is comprised of an exterior top surface, an interior top surface, an exterior side surface, and an interior side surface. The vacuum tool is further comprised of a vacuum aperture extending through the exterior top surface and the interior top surface of the vacuum distributor. The vacuum tool is additionally comprised of a vacuum distribution cavity. The vacuum distribution cavity is formed, at least in part, by the interior top surface and the interior side surface, wherein an obtuse angle is formed between the interior top surface and the interior side surface. The vacuum tool is further comprised of a switchable plate. The plate is comprised of an interior plate surface and an exterior plate surface. A plurality of apertures extends through the interior plate surface and the exterior plate surface. The switchable plate is removably coupled to the vacuum distributor enclosing the vacuum distribution cavity within the vacuum distributor and the switchable plate.

In another aspect, the present invention provides another vacuum tool. The vacuum tool is comprised of a plurality of vacuum distributors. Each vacuum distributor is coupled to at least one other vacuum distributor. The vacuum tool is further comprised of a plurality of discrete vacuum distribution cavities. Each of the vacuum distributors forms, at least in part, an associated vacuum distribution cavity. The vacuum tool further comprises a vacuum plate having a plurality of apertures. The vacuum plate is removably coupled to one or more the vacuum distributors. The plate and the vacuum distributors enclose the vacuum distribution cavities.

A third aspect of the present invention provides a method of manufacturing utilizing a vacuum tool comprised of a removably coupled plate. The method is comprised of removing a first plate from the vacuum tool. The first plate has a first configuration of apertures, such as size, size, and/or location of one or more apertures. The method is further comprised of removably coupling a second plate having a second configuration of a plurality of apertures to the vacuum tool. The second configuration is different from the first configuration.

Having briefly described an overview of embodiments of the present invention, a more detailed description follows.

Figures 1, 2:
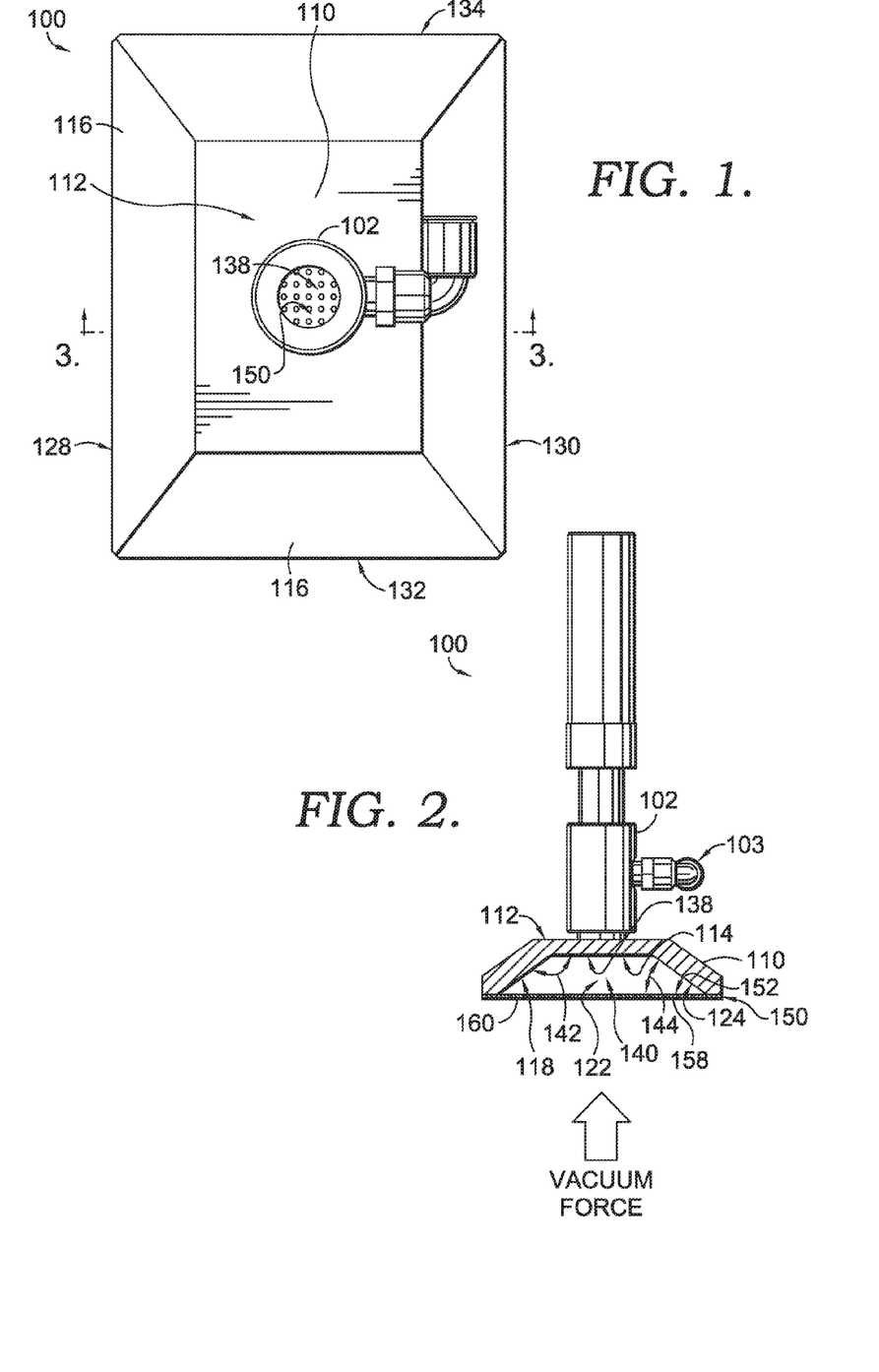
FIG. 1 depicts a top-down view of an exemplary vacuum tool, in accordance with embodiments of the present invention.
FIG. 2 depicts a front-to-back perspective cut view along a cut line that is parallel to cutline 3-3 of the vacuum tool in FIG. 1, in accordance with aspects of the present invention.

FIG. 1 depicts a top-down view of an exemplary vacuum tool 100, in accordance with embodiments of the present invention. In various aspects, the vacuum tool 100 may also be referred to as a vacuum-powered part holder. For example, the vacuum tool 100 may be useable in an automated (or partially automated) manufacturing process for the movement, positioning, and/or maintaining of one or more parts. The parts manipulated by the vacuum tool 100 may be rigid, malleable, or any combination of characteristics (e.g., porous, non-porous). In an exemplary aspect, the vacuum tool 100 is functional for picking and placing a part constructed, at least in part, of leather, polymers (e.g., PU, TPU), textiles, rubber, foam, mesh, and/or the like.

The material to be manipulated by a vacuum tool may be of any type. For example, it is contemplated that a vacuum tool described herein is adapted for manipulating (e.g., picking and placing) flat, thin, and/or lightweight parts of various shapes, materials, and other physical characteristics (e.g. pattern cut textiles, non-woven materials, mesh, plastic sheeting material, foams, rubber). Therefore, unlike industrial-scaled vacuum tools functional for manipulating a heavy, rigid, or non-porous material, the vacuum tools provided herein are able to effectively manipulate a variety of materials (e.g., light, porous, flexible).

The vacuum tool 100 is comprised of a vacuum generator 102. The vacuum generator generates a vacuum force (e.g., low pressure gradient relative to ambient conditions). For example, the vacuum generator may utilize traditional vacuum pumps operated by a motor (or engine). The vacuum generator may also utilize a venturi pump to generate a vacuum. Further yet, it is contemplated that an air amplifier, which is also referred to as a coandă effect pump, is also utilized to generate a vacuum force. Both the venturi pump and the coandă effect pump operate on varied principles of converting a pressurized gas into a vacuum force effective for maintaining a suction action. While the following disclosure will focus on the venturi pump and/or the coandă effect pump, it is contemplated that the vacuum generator may also be a mechanical vacuum that is either local or remote (coupled by way of tubing, piping, and the like) to the vacuum tool 100.

The vacuum tool 100 of FIG. 1 is also comprised of a vacuum distributor 110. The vacuum distributor 110 distributes a vacuum force generated by the vacuum generator 102 across a defined surface area. For example, a material to be manipulated by the vacuum tool 100 may be a flexible material of several square inches in surface area (e.g., a leather portion for a shoe upper). As a result of the material being at least semi-flexible, the vacuum force used to pick up the part may be advantageously dispersed across a substantial area of the part. For example, rather than focusing a suction effect on a limited surface area of a flexible part, which may result in bending or creasing of the part once support underneath of the part is removed (e.g., when the part is lifted), dispersing the suction effect across a greater area may inhibit an undesired bending or creasing of the part. Further, it is contemplated that a concentrated vacuum (non-dispersed vacuum force) may damage a part once a sufficient vacuum is applied. Therefore, in an aspect of the present invention, the vacuum force generated by the vacuum generator 102 is distributed across a larger potential surface area by way of the vacuum distributor 110.

In an exemplary aspect, the vacuum distributor 110 is formed from a semi-rigid to rigid material, such as metal (e.g., aluminum) or polymers. However, other materials are contemplated. The vacuum tool 100 is contemplated as being manipulated (e.g. moved/positioned) by a robot, such as a multi-axis programmable robot. As such, limitations of a robot may be taken into consideration for the vacuum tool 100. For example, weight of the vacuum tool 100 (and/or a manufacturing tool 10 to be discussed hereinafter) may be desired to be limited in order to limit the potential size and/or costs associated with a manipulating robot. Utilizing weight as a limiting factor, it may be advantageous to form the vacuum distributor in a particular manner to reduce weight while still achieving a desired distribution of the vacuum force.

Other consideration may be evaluated in the design and implementation of the vacuum tool 100. For example, a desired level of rigidity of the vacuum tool 100 may result in reinforcement portions and material removed portions, as will be discussed with respect to FIG. 17 hereinafter, being incorporated into the vacuum tool 100.

The vacuum distributor 110 is comprised of an exterior top surface 112 and an exterior side surface 116. FIG. 1 depicts a vacuum distributor with a substantially rectangular footprint. However, it is contemplated that any footprint may be utilized. For example, a non-circular footprint may be utilized. A non-circular footprint, in an exemplary aspect, may be advantageous as providing a larger useable surface area for manipulating a variety of part geometries. Therefore, the use of a non-circular footprint may allow for a greater percentage of the footprint to be in contact with a manipulated part as compared to a circular footprint. Also with respect to shape of a vacuum tool 100 beyond the footprint, it is contemplated, as will be discussed hereinafter, that any three-dimensional geometry may be implemented for the vacuum distributor 110. For example, an egg-like geometry, a pyramid-like geometry, a cubical-like geometry, and the like may be utilized. In an exemplary aspect, a rectangular footprint may provide an easier geometry than a non-rectangular footprint for referencing a location of a part relative to the footprint.

The exemplary vacuum distributor 110 of FIG. 1 is comprised of the exterior top surface 112 and a plurality of exterior side surfaces 116. The vacuum distributor 110 also terminates at edges resulting in a first side edge 128, a second parallel side edge 130, a front edge 132, and an opposite parallel back edge 134.

FIG. 1 depicts a cutline 3-3 demarking a parallel view perspective for FIG. 2. FIG. 2 depicts a front-to-back perspective cut view that is parallel along cutline 3-3 of the vacuum tool 100, in accordance with aspects of the present invention. FIG. 2 depicts, among other features, a vacuum distribution cavity 140 and a vacuum plate 150 (also sometimes referred to as the "plate" herein). The vacuum distributor 110 and the plate 150, in combination, define a volume of space forming the vacuum distribution cavity 140. The vacuum distribution cavity 140 is a volume of space that allows for the unobstructed flow of gas to allow for an equalized dispersion of a vacuum force. In an exemplary aspect, the flow of gas (e.g., air) from the plate 150 to the vacuum generator 102 is focused through the utilization of angled interior side surface(s) 118. As depicted in FIG. 2, there are four primary interior side surfaces 118, a first interior side surface, a second interior side surface 122, a third interior side surface 124, and a fourth interior side surface. However, it is contemplated that other geometries may be utilized.

The interior side surfaces 118 extend from the interior top surface 114 toward the plate 150. In an exemplary aspect, an obtuse angle 142 is formed between the interior top surface and the interior side surfaces 118. The obtuse angle provides an air vacuum distribution effect that reduces internal turbulence of air as it passes from the plate 150 toward a vacuum aperture 138 serving the vacuum generator 102. By angling the approach of air as it enters the vacuum aperture 138, a reduced amount of material may be utilized with the vacuum distributor 110 (e.g., resulting in a potential reduction in weight) and the flow of air may be controlled through a reduction in air turbulence. However, aspects contemplate a right angle such as that formed by a cube-like structure, a cylinder-like structure and the like.

An angle 144 may also be defined by the intersection of the interior side surfaces 118 and the plate 150. For example, if the angle 142 is obtuse, the angle 144 is acute. Again, having an acute angle 144 may provide advantages with the flow of air and the ability to reduce/limit weight of the vacuum tool 100 in general.

A surface area of the interior top surface 114 may be less than a surface area of the exterior plate surface 158 when an obtuse angle is utilized between the top surface 114 and one or more interior side surfaces 118. This potential discrepancy in surface area serves as a funneling geometry to further reduce turbulence and effectively disperse a vacuum force.

In an exemplary aspect, the interior side surfaces 118 are in a parallel relationship with an associated exterior side surface 116. Similarly, in an exemplary aspect the interior top surface 114 is in a parallel relationship, at least in part, with the exterior top surface 112. However, it is contemplated that one or more of the surfaces are not in a parallel relationship with an associated opposite surface. For example, if one or more of the interior surfaces are curved in one or more directions, the exterior surface may instead maintain a linear relationship that is, at the most, tangential to the interior surfaces. Similarly, it is contemplated that the interior and exterior surfaces may maintain a parallel (either linear or curved) relationship in part or in whole.

The vacuum aperture 138 may include a series of threads allowing the vacuum generator 102 to be screwed and secured to the vacuum distribution cavity. Similarly, it is contemplated that other mating patterns (e.g., tapering) may be formed on the interior surface of the vacuum aperture 138 and the vacuum generator 102 to secure the vacuum generator 102 and the vacuum distributor 110 together with a air-tight bond.

The plate 150, which will be discussed in greater detail in FIGS. 5-15 hereinafter, has an interior plate surface 152 (i.e., top surface) and an opposite exterior plate surface 158 (i.e., bottom surface). The plate 150 may be a sheet-like structure, panel-like structure, and/or the like. The exterior plate surface 158 is adapted for contacting a part to be manipulated by the vacuum tool 100. For example, the plate 150 in general, or the exterior plate surface 158 in particular, may be formed from a non-marring material. For example, aluminum or a polymer may be used to form the plate 150 in whole or in part. Further, it is contemplated that the plate 150 is a semi-rigid or rigid structure to resist forces exerted on it from the vacuum generated by the vacuum generator 102. Therefore, the plate 150 may be formed of a material having a sufficient thickness to resist deforming under pressures created by the vacuum generator 102. Further, it is contemplated that the plate 150 and/or the vacuum distributor 110 are formed from a non-compressible material. Further, it is contemplated that the vacuum tool 100 does not form to the contours of a part being manipulated as would a suction-cup like device. Instead, the semi-rigid to rigid material maintain a consistent form regardless of being in contact with a manipulated part or not.

However, it is also contemplated that the plate is formed from a mesh-like material that may be rigid, semi-rigid, or flexible. The mesh-like material may be formed by interlaced material strands made from metal, textile, polymers, and/or the like. Further, it is contemplated that the plate may also be comprised of multiple materials. For example, the plate may be formed from a base structural material (e.g., polymer, metal) and a second part-contacting material (e.g., polymer, foam, textile, and mesh). The multiple-material concept may allow for the plate to realize advantages of the multiple materials selected.

The plate 150, in an exemplary aspect, is coupled, either permanently or temporarily, to the vacuum distributor 110. For example, it is contemplated that the plate 150 may be removable/replaceable to allow for adaptability to different materials and specifications. Continuing with this example, and as will be discussed with reference to FIGS. 5-14, various aperture sizes, shapes, and spacing may be used depending on the material to be manipulated (e.g., porous materials, non-porous materials, large materials, small materials, dense materials, light materials). If the plate 150 is removable (i.e., temporarily coupled), a fastening mechanism may be used (e.g., adhesive, hardware, clamps, channels, and the like) to ensure a tight bond between the plate 150 and the vacuum distributor 110. If the plate 150 is permanently coupled to the vacuum distributor 110, then known techniques may be used (e.g., welding, bonding, adhesives, mechanical fasteners, and the like).

When used in combination, the vacuum generator 102, the vacuum distributor 110, and the plate 150, the vacuum tool 100 is functional to generate a suction force that draws a material towards the exterior plate surface 158 (also referred to as a manufacturing-part-contacting surface) where the material is maintained against the plate 150 until the force applied to the material is less than a force repelling (e.g., gravity, vacuum) the material from the plate 150. In use, the vacuum tool is therefore able to approach a part, generate a vacuum force capable of temporarily maintaining the part in contact with the plate 150, move the vacuum tool 100 and the part to a new location, and then allow the part to release from the vacuum tool 100 at the new position (e.g., at a new location, in contact with a new material, at a new manufacturing process, and the like).

In an exemplary aspect, the plate 150 (or in particular the exterior plate surface 158) has a surface area that is larger than a material/part to be manipulated. Further, it is contemplated that one or more apertures extending through the plate 150 are covered by a part to be manipulated. Stated differently, it is contemplated that a surface area defined by one or more apertures extending through the plate 150 exceeds a surface area of a part to be manipulated. Additionally, it is contemplated that a geometry defined by two or more apertures extending through the plate 150 results in one or more apertures not contacting (completely or partially) a material/part to be manipulated. As a result, it is contemplated that inefficiency in vacuum force is experienced by the vacuum tool as a result of unusable apertures. However, in an exemplary aspect, the inclusion of unusable apertures is an intended result to allow for a higher degree of latitude in positioning the vacuum tool relative to the part. Further, the intentional inclusion of unusable (unusable for purposes of a particular part to be manipulated (e.g., active vacuum apertures that are ineffective for contacting a portion of the part)) apertures allows for vacuum force leakage while still effectively manipulating a part. In an exemplary aspect, a plurality of apertures extending through a plate 150 is further comprised of one or more leaking apertures, an aperture not intended to be used in the manipulation of a part.

In an exemplary aspect, it is contemplated that a vacuum tool, such as the vacuum tool 100, is capable of generating a suction force up to 200 grams. Further, it is contemplated that the pickup tool 100 may have 60 grams to 120 grams of vacuum (i.e., suction) force. In an exemplary aspect, the pickup tool 100 operates with about 90 grams of vacuum force. However, it is contemplated that changes in one or more configurations (e.g., vacuum generator, plate, apertures), material of part being manipulated (e.g., flexibility, porosity), and percent of apertures covered by the part may all affect a vacuum force of an exemplary pickup tool. Further, it is contemplated that when multiple distributors are used in conjunction the vacuum force is adjusted commensurately. For example, the pickup tool of FIG. 16 (to be discussed hereinafter) has ten vacuum distributors and may therefore have a vacuum force of about 600 grams to about 1.2 kilograms (10×60 to 120 grams). Similarly, a pickup tool having 6 vacuum distributors may have a suction force of about 540 grams (6×90 grams). However, it is contemplated that air pressure/volume supplied to the vacuum generators is not affected by a plurality of generators operating simultaneously. If an air pressure or value is reduced (or otherwise altered) it is contemplated that a resulting cumulative vacuum force is also altered.

Figure 3:
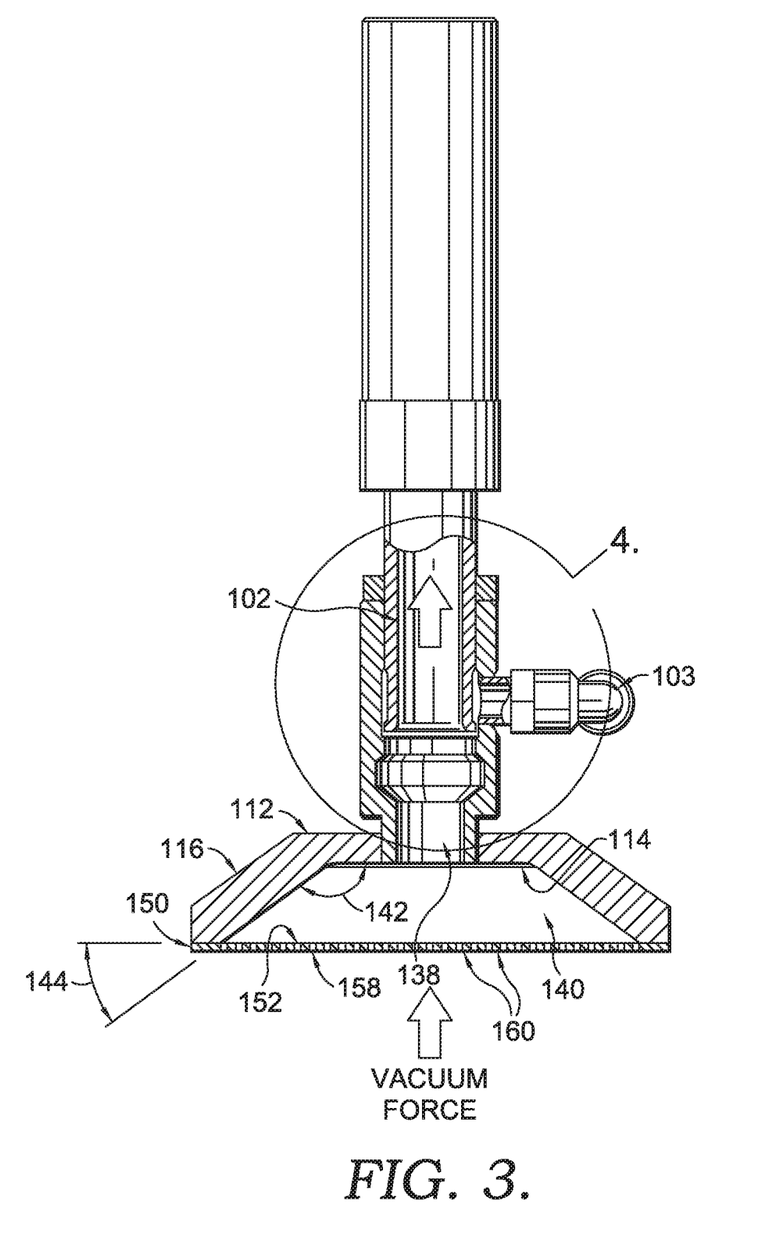
FIG. 3 depicts a front-to-back view of the vacuum tool along the cutline 3-3 of FIG. 1, in accordance with aspects of the present invention.

FIG. 3 depicts a front-to-back view of the vacuum tool 100 along the cutline 3-3 of FIG. 1, in accordance with aspects of the present invention. In particular, FIG. 3 provides a cut view of the vacuum generator 102. As will be discussed in greater detail with respect to FIG. 4, the vacuum generator 102, in the exemplary aspect, is an air amplifier utilizing a coandă effect to generate a vacuum force.

In this example, air is drawn from the exterior plate surface 158 through a plurality of apertures 160 through the plate 150 to the vacuum distribution cavity 140. The vacuum distribution cavity 140 is enclosed between the vacuum distributor 110 and the plate 150, such that if the plate 150 is a non-porous (i.e., lacked the plurality of apertures 160) surface, then an area of low pressure would be generated in the vacuum distribution cavity 140 when the vacuum generator 102 is activated. However, returning to the example including the plurality of aperture 160, the air is drawn into the vacuum distribution cavity 140 towards the vacuum aperture 138, which then allows the air to be drawn into the vacuum generator 102.

Figure 4:
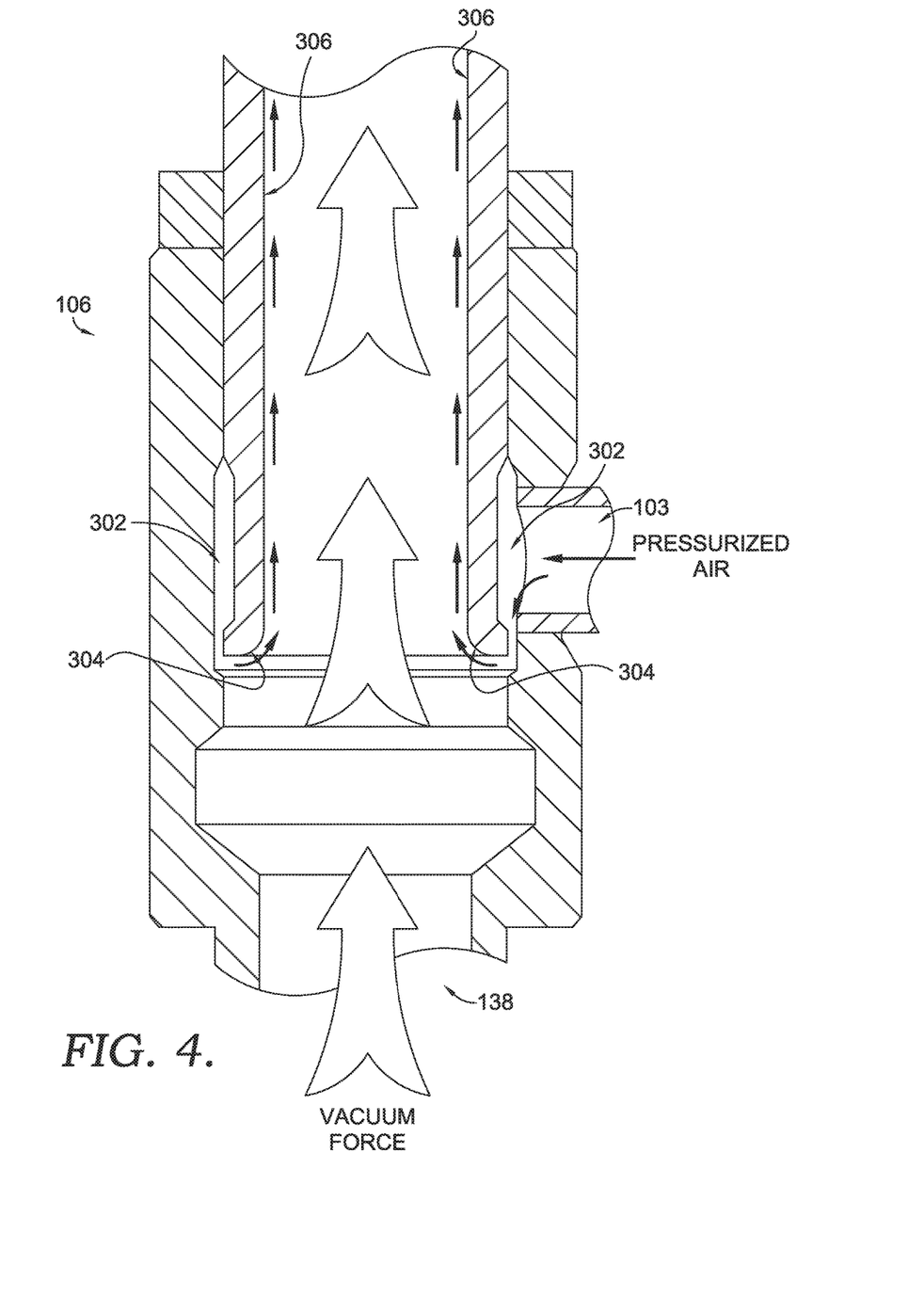
FIG. 4 depicts a focused view of the vacuum generator as cut along the cutline 3-3 from FIG. 1, in accordance with aspects of the present invention.

FIG. 3 identifies a zoomed view of the vacuum generator 102 depicted in FIG. 4. FIG. 4 depicts a focused view of the vacuum generator 102 as cut along the cutline 3-3 from FIG. 1, in accordance with aspects of the present invention. The vacuum generator depicted in FIG. 4 is a coandă effect (i.e., air amplifier) vacuum pump 106. The coandă effect vacuum pump injects pressurized air at an inlet 103. The inlet 103 directs the pressurized air through an internal chamber 302 to a sidewall flange 304. The pressurized air, utilizing the coandă effect, curves around the sidewall flange 304 and flows along an internal sidewall 306. As a result of the pressurized air movement, a vacuum force is generated in the same direction as the flow of the pressurized air along the internal sidewall 306. Consequently, a direction of suction extends up through the vacuum aperture 138.

Figure 5:
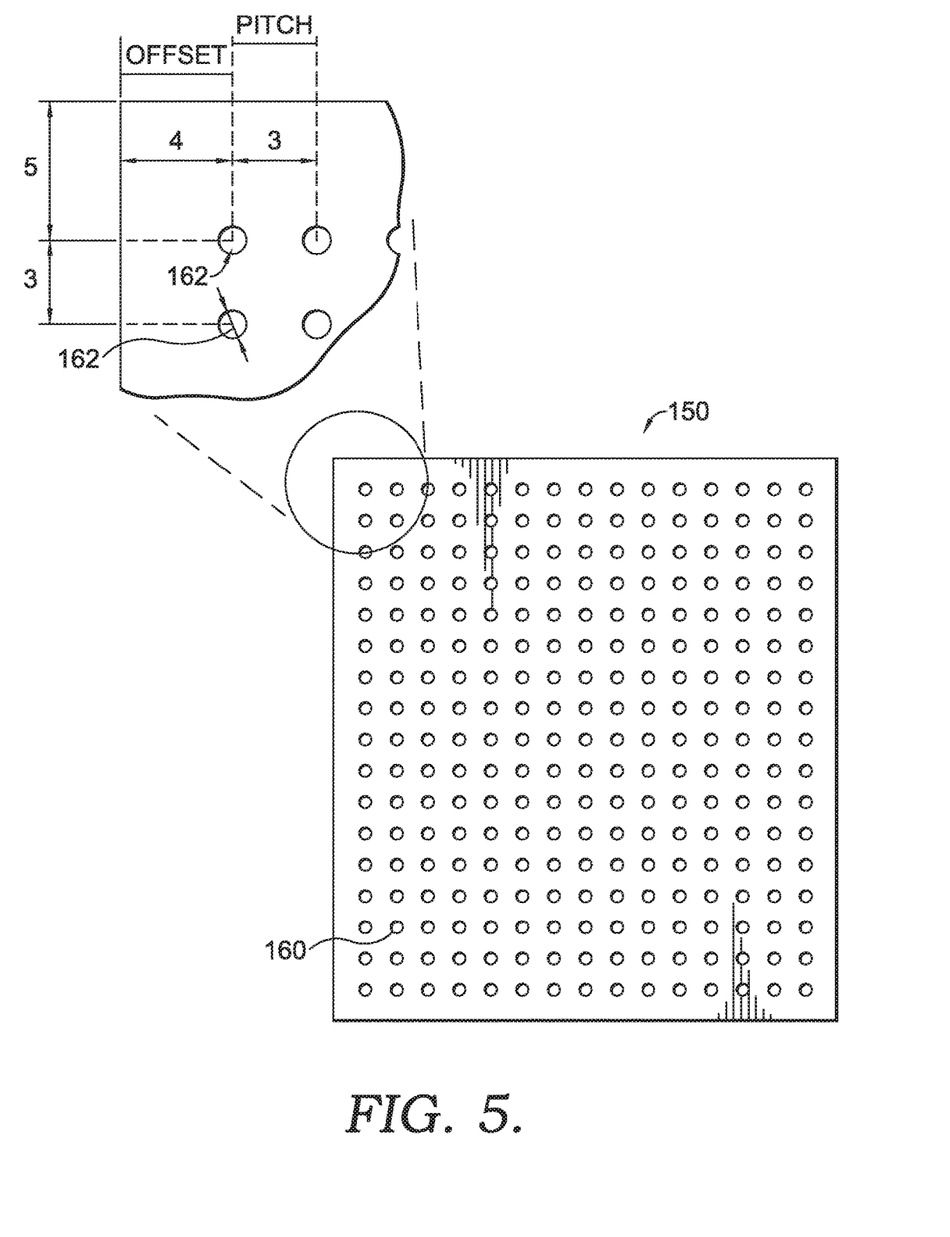
FIG. 5 depicts an exemplary plate comprised of the plurality of apertures, in accordance with aspects of the present invention.

FIG. 5 depicts an exemplary plate 150 comprised of the plurality of apertures 160, in accordance with aspects of the present invention. While the plate 150 is illustrated as having a rectangular footprint, as previously discussed, it is contemplated that any geometry may be implemented (e.g., circular, non-circular) depending, in part, on the material to be manipulated, a robot controlling the vacuum tool 100, and/or components of the vacuum tool 100. Further, it is contemplated that in exemplary aspects a first plate may be substituted for a second plate on the vacuum tool. For example, rather than switching out an entire vacuum tool as a result of a change in material, parts, etc., the plate 150 may instead be changed on a particular vacuum tool to provide alternative characteristics to the vacuum tool (e.g., a first plate may have a few large apertures and a second plate may have many small apertures).

The plurality of apertures 160 may be defined, at least in part, by a geometry (e.g., circular, hatch, bulbous, rectangular), size (e.g., diameter, radius, area, length, width), offset from elements (e.g., distance from outer edge, distance from a non-porous portion), and pitch (e.g., distance between apertures). The pitch of two apertures is defined as a distance from a first aperture to a second aperture. The pitch may be measured in a variety of manners. For example, the pitch may be measured from the closest two points of two apertures, from the surface area center of two apertures (e.g., center of circular apertures), from a particular feature of two apertures.

The size of the apertures may be defined based on an amount of surface area (or a variable to calculate surface area) exposed by each aperture. For example, a diameter measurement provides an indication of a circular aperture's size.

Depending on desired characteristics of a vacuum tool, the variables associated with the apertures may be adjusted. For example, a non-porous material of low density may not require much vacuum force to maintain the material in contact with the vacuum tool under normal operating conditions. However, a large porous mesh material may, on the other hand, require a significant amount of vacuum force to maintain the material against the vacuum tool under normal operating conditions. Therefore, to limit the amount of energy placed into the system (e.g., amount of pressurized air to operate a coandă effect vacuum pump, electricity to operate a mechanical vacuum pump) an optimization of the apertures may be implemented.

For example, a variable that may be sufficient for typical materials handled in a footwear, apparel, and the like industry may include, but not be limited to, apertures having a diameter between 0.5 and 5 millimeters (mm), between 1 mm and 4 mm, between 1 mm and 3 mm, 1.5 mm, 2 mm, 2.5 mm, 3 mm, and the like. However, larger and smaller diameter (or comparable surface area) apertures are contemplated. Similarly, the pitch may range between 1 mm and 8 mm, between 2 mm and 6 mm, between 2 mm and 5 mm, 3 mm, 3.5 mm, 4 mm, 4.5 mm, 5 mm, 5.5 mm, 6 mm, and the like. However, larger and smaller pitch measurements are contemplated.

Additionally, it is contemplated that a variable size and a variable pitch may be implemented in aspects of the present invention. For example, a compound part composed of both a porous material portion and a non-porous material portion may utilize different variables to accomplish the same level of manipulation. In this example, variables that lead to a reduction in necessary vacuum force in an area to be contacted by the non-porous material and variable that lead to higher vacuum forces in an area to be contacted by the porous material may be implemented. Further, a vision system or other identification system may be used in conjunction to further ensure a proper placement of the material with respect to the plurality of apertures occurs. Additionally, it is contemplated that a relationship between pitch and size may be utilized to locate the plurality of apertures. For example, a pitch from a larger sized aperture may be greater than a pitch from a smaller sized aperture (or vice versa).

An additional variable is the offset. In an exemplary aspect, the offset is a distance of an aperture from an outside edge of the plate 150. Different apertures may have different offsets. Further different edges may implement different offsets. For example an offset along a front edge may be different from an offset along a side edge. The offset may range from no offset to 8 mm (or more). In practice, an offset ranging from 1 mm to 5 mm may accomplish characteristics of exemplary aspects of the present invention.

The plurality of apertures 160 may be formed in the plate 150 utilizing a number of manufacturing techniques. For example apertures may be punched, drilled, etched, carved, melted, and/or cut from the plate 150. In an exemplary embodiment, the plate 150 is formed from a material that is responsive to laser cutting. For example polymer-based materials and some metal-based materials may be used in conjunction with laser cutting of the plurality of apertures. Further, it is contemplated that the geometry of the apertures may be variable as the aperture extends through the thickness of the plate. For example, the aperture may have a diameter of a first size on a top surface of the plate and a diameter of a second size at the opposite bottom surface of the plate. This variable in geometry mat result in a conical geometry extending through the plate. Additional geometries are contemplated herein (e.g., pyramid).

Figure 6:
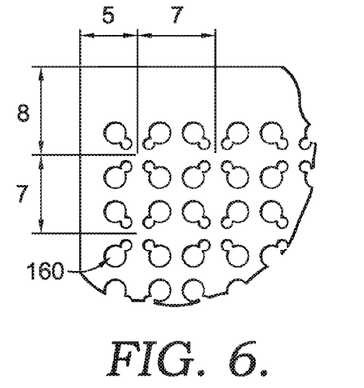
FIGS. 6-15 depict various aperture variations in a plate, in accordance with aspects of the present invention.
Figure 7:
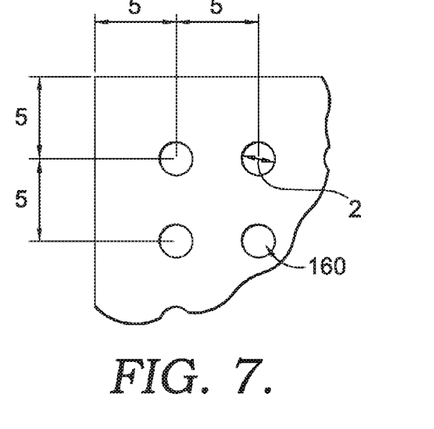
Figure 8:
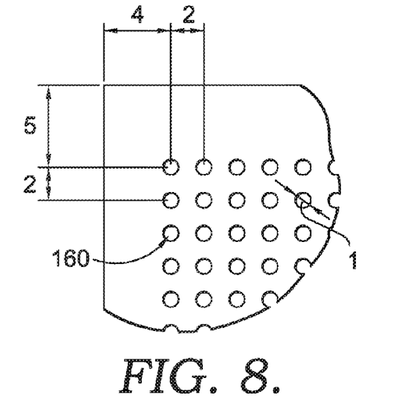
Figure 9:
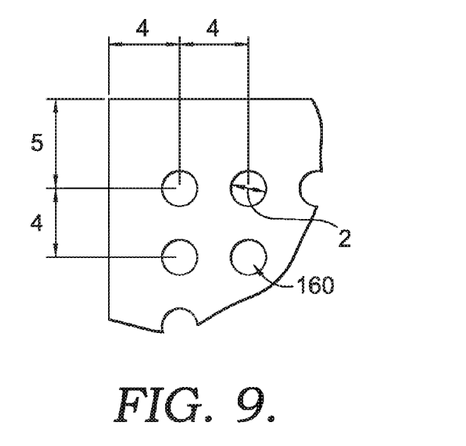
Figure 10:
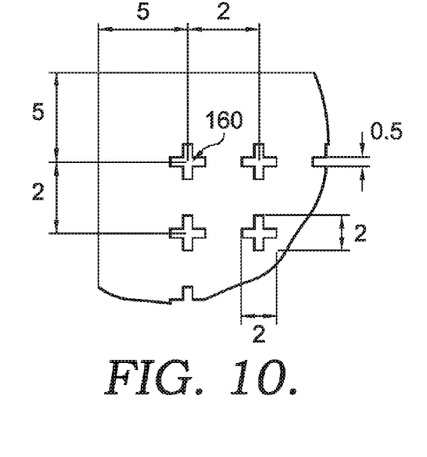
Figure 11:
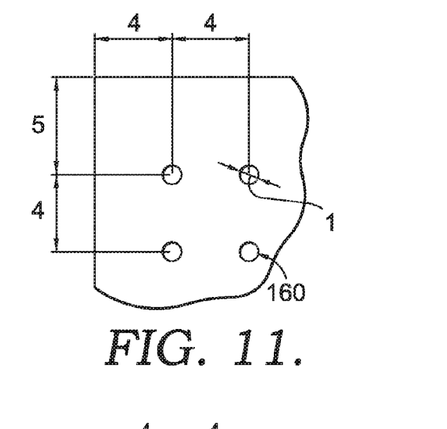
Figure 12:
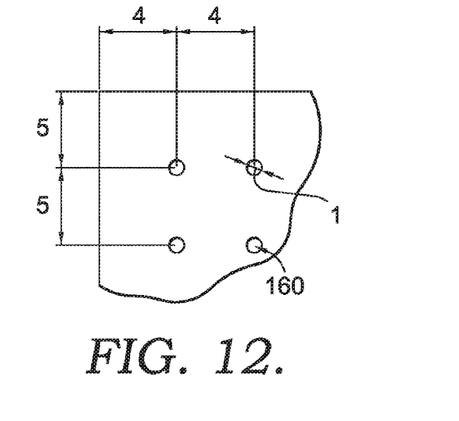
Figure 13:
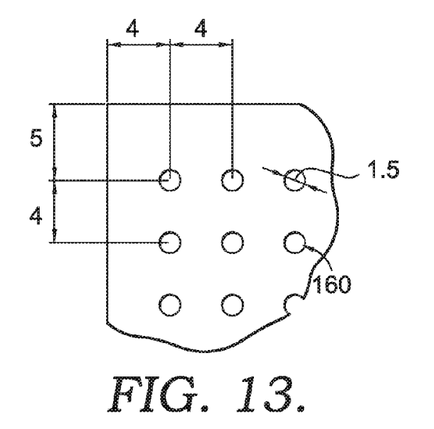
Figure 14:
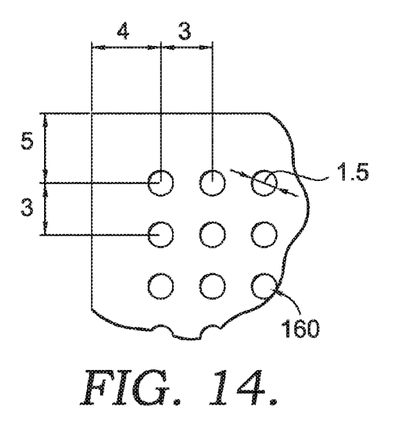
Figure 15:
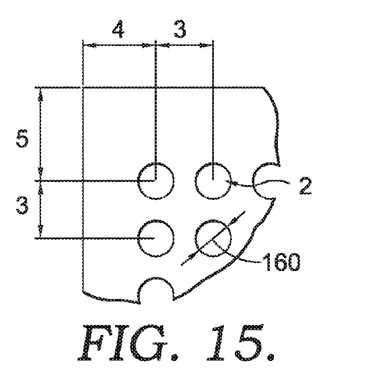

FIGS. 6-15 provide exemplary aperture variable selections similar to that discussed with respect to FIG. 5, in accordance with aspects of the present invention. The following examples are not intended to be limiting, but instead exemplary in nature. FIG. 6 depicts non-circular apertures having a first offset of 5 mm and a second offset of 8 mm and a pitch of 7 mm. FIG. 7 depicts circular apertures having an offset and pitch of 5 mm with a diameter of 2 mm. FIG. 8 depicts circular apertures having a diameter of 1 mm, a pitch of 2 mm, and offsets of 4 mm and 5 mm. FIG. 9 depicts circular apertures having a diameter of 2 mm, a pitch of 4 mm, and offsets of 5 mm and 4 mm. FIG. 10 depicts exemplary geometric apertures having a pitch of 4 mm and offsets of 5 mm. FIG. 11 depicts circular apertures having a diameter of 1 mm, a pitch of 4 mm, and offsets of 5 mm and 4 mm. FIG. 12 depicts circular apertures having a diameter of 1 mm, a pitch of 5 mm, and offsets of 5 mm. FIG. 13 depicts circular apertures having a diameter of 1.5 mm, a pitch of 4 mm, and offsets of 5 mm and 4 mm. FIG. 14 depicts circular apertures having a diameter of 1.5 mm, a pitch of 3 mm, and offsets of 4 mm. FIG. 15 depicts circular apertures having a diameter of 2 mm, a pitch of 3 mm, and offsets of 5 mm and 4 mm. As previously discussed, it is contemplated that shape, size, pitch, and offset may be altered uniformly or variably in any combination to achieve a desired result.

Depending on the footprint of the plate 150, the offset, the pitch, the geometry of the apertures, the layout of the apertures, and the size of the apertures, any number of apertures may be utilized. For example, it is contemplated that the plate 150 of FIG. 16 may have 11,000 to 11,500 apertures. In a particular aspect, it is contemplated around 11,275 apertures are utilized on the plate 150 of FIG. 16. Further, a plate may be comprised of 4,500 to 4,750 apertures. In particular, it is contemplated that 4,700 apertures may be included in an exemplary plate.

Changes to the vacuum generator 102, the plate 150, and the overall size of the vacuum tool 100 may affect the air consumption and pressure when utilizing a coandă effect vacuum pump or a venturi vacuum pump For example, it is contemplated that a given coandă effect vacuum pump may generate 50 g/cm$^2$ of vacuum force. To accomplish this level of vacuum, it is contemplated that a pneumatic pressure of 0.55 to 0.65 MPa of pressure are introduced to the vacuum tool. The volume of air consumption to generate sufficient vacuum may also vary based on the variables. For example, it is contemplated that 1,400 Nl/min of air consumption may be utilized for the vacuum tool 100 of FIG. 16. Further, it is contemplated that 840 Nl/min of air consumption may be utilized for a vacuum tool. Further, it is contemplated that 360 Nl/min of air consumption may be utilized for a vacuum tool. As previously discussed, the footprint (e.g., surface area of the plate 150) may also affect vacuum force, air consumption, and the like. For example, it is contemplated that a plate may have a footprint approximately of 625 mm by 340 mm. Similarly, it is contemplated that a plate may have a footprint approximately of 380 mm by 240 mm. Clearly, it is contemplated that the proportions of a vacuum distributor may be altered based on a desired level of vacuum force, footprint, and additional variables.

Figure 16:
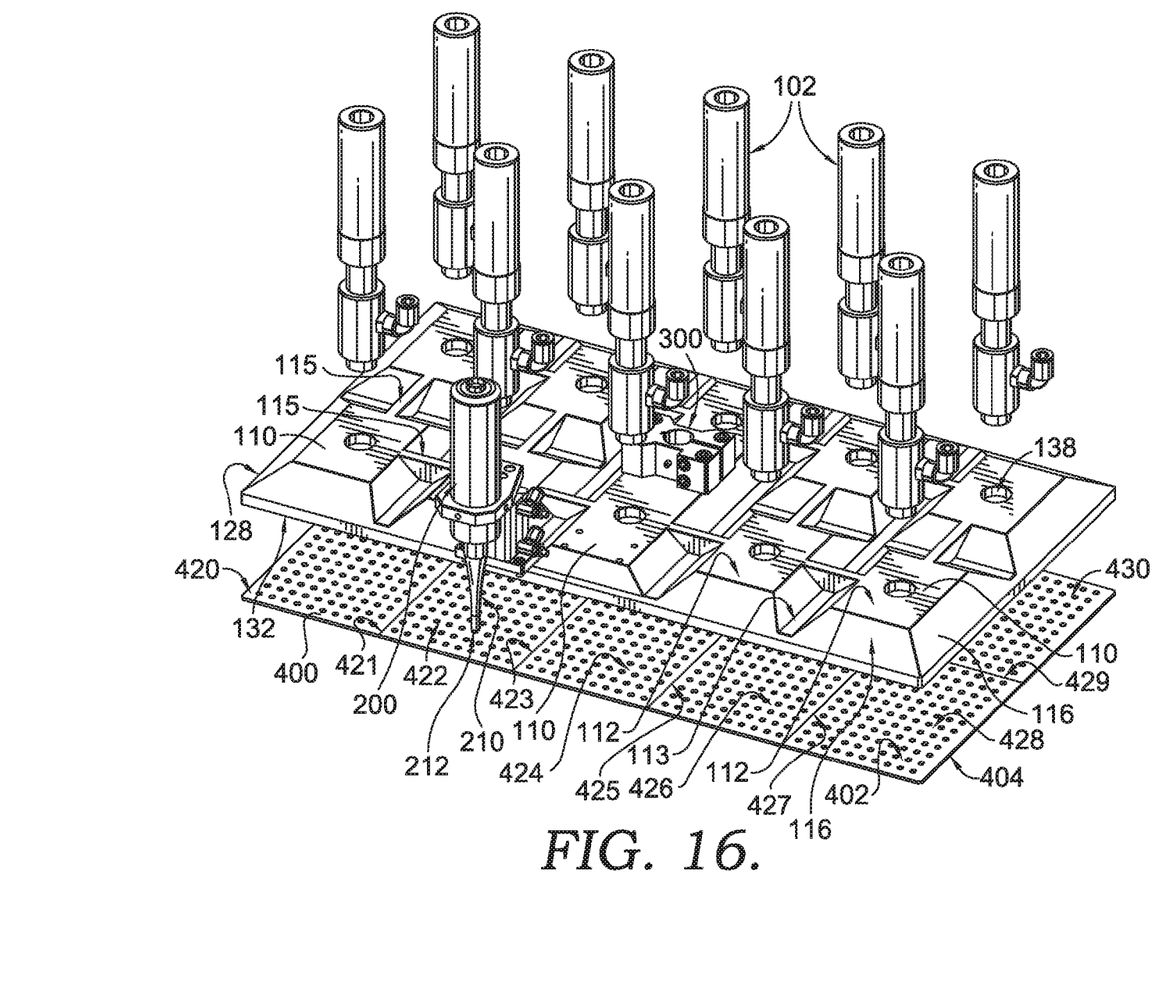
FIG. 16 depicts an exploded view of a manufacturing tool comprised of a vacuum tool utilizing a multi-portion plate and an ultrasonic welder, in accordance with aspects of the present invention.

FIG. 16 depicts an exploded view of a manufacturing tool 10 comprised of a vacuum tool 100 utilizing a multi-portion plate 400 and an ultrasonic welder 200, in accordance with aspects of the present invention. Unlike the vacuum tool 100 discussed with respect to FIGS. 1 and 2, the vacuum tool 100 of FIG. 16 incorporates a plurality of vacuum generators 102, vacuum distributors 110, and vacuum distribution cavities 140 into a unified vacuum tool 100 having the multi-portion plate 400. As will be discussed hereinafter, advantages may be realized by the ability to selectively activate/deactivate vacuum force in individual portions of the vacuum tool 100. Additionally, a greater control of continuous vacuum force may be achieved by having segregated portions of the vacuum tool 100. Further, it is contemplated that a first portion of the vacuum plate 400 may have a different aperture pattern (e.g., size, pitch, offset, shape, etc.)

than a second portion. Further, it is contemplated that one or more portions of the multi-portion plate 400 may be removed and replaced with alternative plate portions having different characteristics (e.g., aperture pattern).

The manufacturing tool 10 also is comprised of a coupling member 300. The coupling member 300 is a feature of the manufacturing tool 10 (or the vacuum tool 100 or the ultrasonic welder 200 individually) allowing a positional member (not shown) to manipulate the position, attitude, and/or orientation of the manufacturing tool 10. For example, the coupling member 300 may allow for the addition of the manufacturing tool to a computer-numerically-controlled (CNC) robot that has a series of instruction embodied on a non-transitory computer-readable medium, that when executed by a processor and memory, cause the CNC robot to perform a series of steps. For example, the CNC robot may control the vacuum generator(s) 102, the ultrasonic welder 200, and/or the position to which the manufacturing tool 10 is located. The coupling member 300 may, therefore, allow for the temporary or permanent coupling of the manufacturing tool 10 to a positional member, such as a CNC robot.

As was previously discussed, aspects of the present invention may form portions of the manufacturing tool 10 with the intention of minimizing mass. As such, the plurality of vacuum distributors 110 of FIG. 16 include reduced material portions 113. The reduced material portions 113 eliminate portions of what could otherwise be a uniform exterior top surface. The introduction of reduced material portions 113 reduces weight of the manufacturing tool 10 to allow for a potentially smaller positional member 310 to be utilized, which may save on space and costs. Additional locations for reduced material portions 113 are contemplated about the vacuum tool 100 (e.g., side, bottom, top).

However, aspects of the present invention may desire to remain a level of rigidity of the plurality of vacuum distributors 110 as supported by a single coupling member 300. To maintain a level of rigidity while still introducing the reduced material portions 113, reinforcement portions 115 may also be introduced. For example, reinforcement portions 115 may extend from one vacuum distributor 110 to another vacuum distributor 110. Further yet, it is contemplated that in aspects of the present invention, reinforcement portions 115 may be included proximate the coupling member 300 for a similar rationale.

The plate 400 is separated from the plurality of vacuum distributors 110 in FIG. 16 for illustrative purposes. As a result, an interior plate surface 402 is viewable. In an exemplary aspect, the interior plate surface 402 is mated with a bottom portion of the plurality of vacuum distributors 110, forming an air-tight bond in this example.

The plate 400 may be comprised of a plurality of plate portions. For example, the plate 400 of FIG. 16 is comprised of eight plate portions (e.g., plate portions 420, 422, 424, 426, 428, and 430). Each plate portion may be associated with a unique distribution cavity and/or a unique distributor, in an exemplary aspect. In the alternative, multiple plate portions may be utilized in connection with a common distributor and/or distribution cavity. In yet another alternative, an individual plate portion may be associated with a plurality of distributors The plate 400 is contemplated as being removably coupled with one or more distributors or other portions of a vacuum tool. A plate is removably coupled when a first plate (or plate portion) may be coupled with the vacuum tool in a manner so that the plate may function for its intended purpose, but yet be removed from the vacuum tool without significantly deforming or otherwise damaging the plate and/or the vacuum tool. Examples of maintaining mechanisms (e.g., bolts, screws, magnets, adhesives, mechanical interlocking, lacing, friction fit, clips, bands, pins, suction, and the like) that may be used to maintain a plate in a position relative to the vacuum tool will be discussed with respect to FIGS. 17-20. However, additional means of removably coupling a plate and a vacuum tool are contemplated.

A junction may exist between plate portions. A junction is a meeting of a first plate portion and a second plate portion. A junction may represent a location at which a first plate portion may independently be switched from the vacuum tool while not switching a second plate portion. Therefore, as will be discussed with respect to FIG. 21 hereinafter, a variety of aperture patterns may be implemented and adjusted in a zone-like approach through the manipulation of individual plate portions.

A junction between the plates, such as a junction 421, defines a junction between the plate portion 420 and 422. It is contemplated that a tongue and groove-like coupling mechanism may be implemented along a junction to allow for the switchable coupling of the plate portions. Additional edge treatments are contemplated to provide a removable coupling between the plate portions. Other junctions depicted include 423, 425, 427, and 429. It is contemplated that a junction may extend in a linear path creating consistent-sized plate portions. Further it is contemplated that a junction may be formed in an organic or non-linear fashion to provide a level of control over a location of one or more plate portions relative to a material to be manipulated.

The vacuum tool 100 is comprised of a plurality of vacuum generators 102, vacuum distributors 110, and associated vacuum distribution cavities 140. It is contemplated that any number of each may be utilized in a vacuum tool 100. For example, it is contemplated that 10, 8, 6, 4, 2, 1, or any number of units may be combined to form a cohesive vacuum tool 100. Further, any footprint may be formed. For example, while a rectangular footprint is depicted in FIG. 16, it is contemplated that a square, triangular, circular, non-circular, part-matching shape, or the like may instead be implemented. Additionally, the size of the vacuum generator 102 and/or the vacuum distributor 110 may be varied (e.g., non-uniform) in various aspects. For example, in an exemplary aspect, where a greater concentration of vacuum force is needed for a particular application, a smaller vacuum distributor may be utilized, and where a less concentrated vacuum force is needed, a larger vacuum distributor may be implemented.

FIG. 16 depicts exemplary manufacturing tools 10; however, it is understood that one or more components may be added or removed from each aspect. For example, each aspect is comprised of an ultrasonic welder 200 and a vacuum tool 100, but it is contemplated that the ultrasonic welder may be eliminated altogether. Further, it is contemplated that additional features may also be incorporated. For example, vision systems, adhesive applicators (e.g., spray, roll, and other application methods), mechanical fastening components, pressure applicators, curing devices (e.g., ultraviolet light, infrared light, heat applicators, and chemical applicators), and the like may also be incorporated in whole or in part in exemplary aspects.

The ultrasonic welder 200, in an exemplary aspect, is comprised of a stack comprised of an ultrasonic welding horn 210 (may also be referred to as a sonotrode), a converter 220 (may also be referred to as a piezoelectric transducer), and a booster (not labeled). The ultrasonic welder 200 may further be comprised of an electronic ultrasonic generator (may also be referred to as a power supply) and a controller. The electronic ultrasonic generator may be useable for delivering a high-powered alternating current signal with a frequency matching the resonance frequency of the stack (e.g., horn, converter, and booster). The controller controls the delivery of the ultrasonic energy from the ultrasonic welder to one or more parts.

Within the stack, the converter converts the electrical signal received from the electronic ultrasonic generator into a mechanical vibration. The booster modifies the amplitude of the vibration from the converter. The ultrasonic welding horn applies the mechanical vibration to the one or more parts to be welded. The ultrasonic welding horn is comprised of a distal end 212 adapted for contacting a part.

Figure 17:
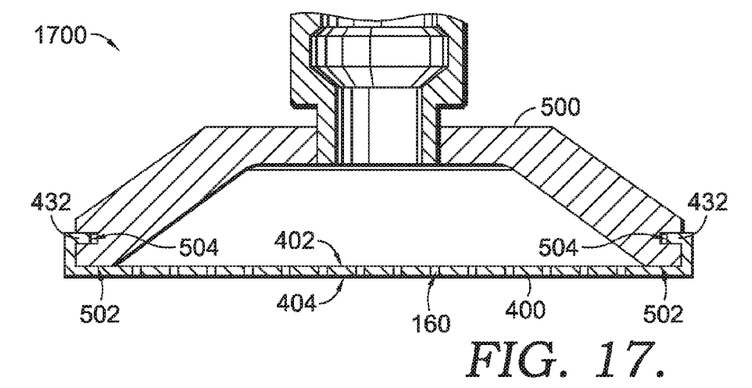
FIG. 17 depicts a cut view of a vacuum tool having a switchable plate utilizing a tongue and groove maintaining mechanism, in accordance with aspects of the present invention.

FIG. 17 depicts an exemplary cut view of a vacuum tool 1700 having a switchable plate 400 utilizing a tongue and groove maintaining mechanism, in accordance with aspects of the present invention. A vacuum distributor 500 is depicted having a particular cross-sectional geometry; however, it is contemplated that any vacuum distributor geometry may be implemented, as previously discussed. The vacuum distributor 500 has a bottom surface 502 intended for contacting the plate 400 (or an intervening material, such as a sealant). The plate 400 has a top surface 402 and a bottom surface 404. Additionally, the plate 400 includes one or more apertures 160 extending between the top surface 402 and the bottom surface 404. It is contemplated that the bottom surface 502 of the vacuum distributor 500 may contact the top surface 402 of the plate 400 when in use. However, as previously discussed, it is contemplated that one or more seal-like materials (e.g., gasket) may be disposed between the bottom surface 502 and the top surface 402 to maintain a tighter fit for effecting a better vacuum.

The vacuum distributor 500 of FIG. 17 is formed with a groove 504 along one or more sides. In this example, the groove 504 is formed along two parallel sides, but it is contemplated that one or more grooves (or an alternative tongue) may instead be positioned at any place along the vacuum tool. The groove 504 provides a receiving channel through which one or more portions of a maintaining mechanism may be inserted. In this example, the plate 400 is comprised of a tongue 432. The tongue 432 is a component of the plate 400 that is adapted to be inserted within the groove 504. When inserted into the groove 504, the tongue 432 maintains the plate 400 in a desired orientation/position relative to the vacuum distributor 500. However, the plate 400 is removably coupled to the vacuum distributor 500 by this maintaining mechanism so as to be switchable.

When utilizing a tongue and groove-like maintaining mechanism, it is contemplated that a first plate portion may be easily switched for a second plate portion with minimal machine downtime. As a result, a common vacuum distributor may be utilized when manipulating a variety of different materials. This may allow for a relatively inexpensive plate portion to be maintained in inventory to allow a relatively more expensive vacuum tool to be a more universal-like manufacturing tool.

While a particular combination of tongue and groove portions are depicted, it is contemplated that a tongue may be formed on at least a portion of the vacuum distributor 500 and a groove may be formed on at least a portion of the plate 400, in an exemplary aspect. Further, while a sliding maintaining mechanism is depicted as engaging an outer surface of the vacuum distributor, it is also contemplated that a sliding maintaining mechanism may also/alternatively engage an interior surface and/or a bottom surface. For example, a T-like protrusion may extend upwardly from the plate 400 top surface 402 to be received by a T-like groove extending into the vacuum distributor 500 from the bottom surface 502. Alternatively, the T-like protrusion may extend downwardly from the bottom surface 502 for reception by a T-like groove extending into the plate 400 from the top surface 402. Alternative shaped protrusion and receiving channels are contemplated.

Figure 18:
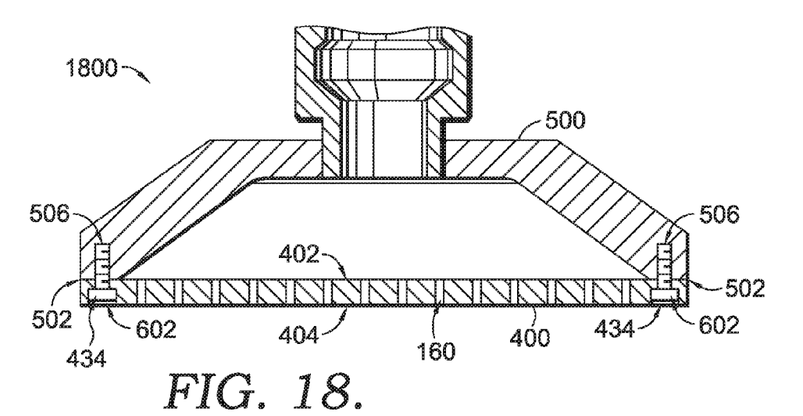
FIG. 18 depicts a cut view of a vacuum tool having a switchable plate utilizing a recessed maintaining mechanism, in accordance with aspects of the present invention.

FIG. 18 depicts a cut view of a vacuum tool 1800 having a switchable plate 400 utilizing a recessed removable maintainer 602, in accordance with aspects of the present invention. As discussed with respect to FIG. 17, a vacuum distributor 500 having a bottom surface 502 is depicted. However, alternative geometric configurations are contemplated. Also similar to FIG. 17, the plate 400 is comprised of a top surface 402 and a bottom surface 404. Additionally, a plurality of apertures extends from the top surface 402 to the bottom surface 404.

The maintaining mechanism depicted in FIG. 18 utilizes a recessed removable maintainer 602 (also referred to as a recessed maintaining mechanism herein). Examples of removable maintainers include, but are not limited to, a screw, a bolt, a rivet, a dowel, a plug, and the like. The removable maintainer 602 may pass through a portion of the plate 400, such as a recessed portion 434 before entering into a portion of the vacuum distributor, such as a reception portion 506. The recessed portion 434 may allow for a countersinking of one or more portions of the removable maintainer, such as a head. For example, if the removable maintainer 602 is a bolt-like component that may utilize a larger head portion to impart a force onto the plate 400, the head portion may be recessed into a portion of the plate 400 to prevent disrupting the plane of the bottom surface 404. Maintaining a planar surface, without disruption from a maintaining mechanism, may ensure the plate 400 is able to effectively maintain a vacuum force, when activated, on one or more materials. The recessed portion 434 is also contemplated as a portion of an aperture through which a maintaining mechanism may pass without having a significant difference from the remainder of the aperture, in an exemplary aspect.

It is contemplated that one or more removable maintainers 602 may be utilized in a variety of location. For example, while the removable maintainer 602 is depicted as extending upwardly through the plate 400 into the vacuum distributor 500, a removable maintainer may extend downwardly through the vacuum distributor 500 into the plate 400. Further, it is contemplated that a removable maintainer may also be utilized in any orientation, such as extending horizontally to couple one or more portions of the vacuum tool. Consequently, any number, type, and/or location of removable maintainer may be implemented to removably couple a plate 400 with a vacuum distributor, directly or indirectly.

Figure 19:
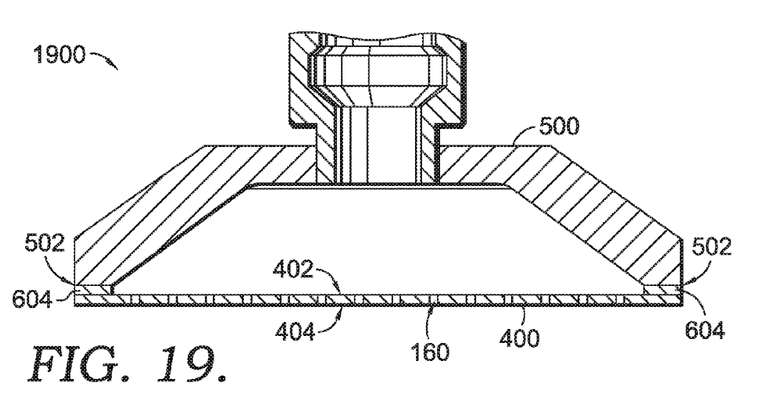
FIG. 19 depicts a cut view of a vacuum tool having a switchable plate utilizing an adhesion maintaining mechanism, in accordance with aspects of the present invention.

FIG. 19 depicts a cut view of a vacuum tool 1900 having a switchable plate 400 utilizing an adhesion maintaining mechanism 604, in accordance with aspects of the present invention. As previously contemplated, the vacuum distributor 500 has a bottom surface 502. Also as contemplated, the plate 400 has a top surface 402 and a bottom surface 404. Further a number of apertures 160 extend from the top surface 402 to the bottom surface 404.

The adhesive maintaining mechanism 604 may be any type of bonding agent. For example, a caulk-like substance that is applied in a first liquid-like state may be applied that provides an adhesive bond when in a second state between the plate 400 and the vacuum distributor 500 with an amount of force that allows for the removal of the plate 400 without damaging or distorting the plate. It is contemplated that the level of bonding required may be on the order of the weight of the plate plus a margin of error. For example, when a vacuum force is generated in an internal cavity between the plate 400 and the vacuum distributor 500, the resulting negative pressure may aid in maintaining the position of the plate 400 relative to the vacuum distributor 500.

Other non-limiting examples of an adhesive maintaining mechanism may include a magnetic material to which at least one of the plate 400 or the vacuum distributor 500 may be attracted. For example, it is contemplated that the plate may be formed from polymer-based material into which one or more ferrous components are embedded. A magnetic material coupled, either permanently or temporarily, to the vacuum distributor 500 may attract the plate 400 to maintain a desired position. Other arrangements are contemplated, such as a magnetic material embedded within the plate that is attracted to one or more portions of the vacuum distributor 500.

Another non-limiting example may include a suction material, such as suction cup-like components, that forms a removable (e.g., temporary) bond with one or more portions of the vacuum tool in order to maintain the plate 400 in a desired position relative to the vacuum distributor 500. While specific examples are provided, it is contemplated that any type of material that may provide a temporary coupling between the plate 400 and the vacuum distributor 500 may be implemented.

Figure 20:
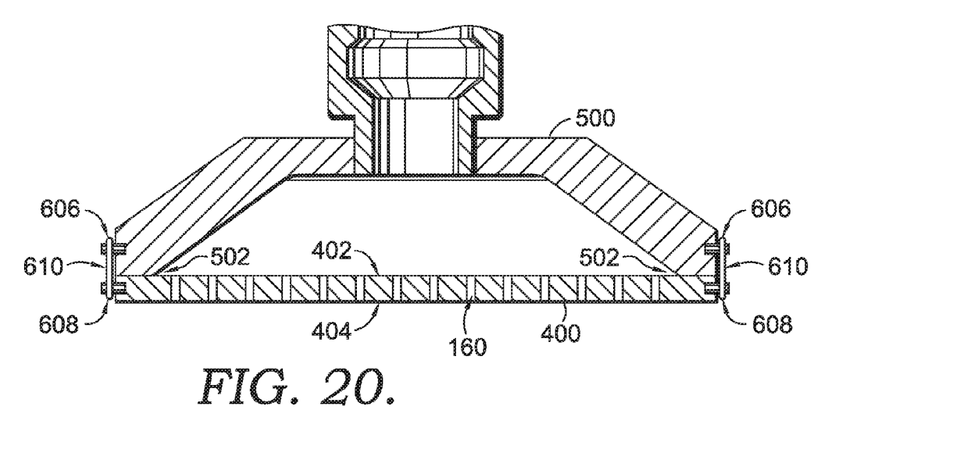
FIG. 20 depicts a cut view of a vacuum tool having a switchable plate utilizing a coupling maintaining mechanism, in accordance with exemplary aspects of the present invention.

FIG. 20 depicts a cut view of a vacuum tool having a switchable plate 400 utilizing a coupling maintaining mechanism comprised of a first connecting point 606, a second connecting point 608, and a connecting member 610, in accordance with exemplary aspects of the present invention. As previously discussed, a vacuum distributor 500 having a bottom surface 502 may be removably coupled with the plate 400 that has a top surface 402 and a bottom surface 404 with apertures 160.

The first connecting point 606 and the second connecting point 608 may be a receiving point functional for receiving a portion of the connecting member 610. For example, the first connecting point 606 may be a hole into which a protrusion of the connecting member 610 may extend. In the alternative, the first connecting point 606 may be a protrusion-like component that extends outwardly from the vacuum tool to be inserted into an opening in the connecting member 610. In this example, the connecting member 610 may be a link having a first hole and a second hole such that the first connecting point 606 extends through the first hole and the second connecting point 608 extends through the second hole.

Alternative physical configurations are contemplated. For example, the first connecting point may provide a protrusion onto which a first end of the connecting member 610 rests while the opposite end of the connecting member is permanently coupled with the plate 400. Further, it is contemplated that the connecting member 610 may be formed from any type of material, such as a material having elastic properties (e.g., rubber, silicone), a material having rigid properties (e.g., metallic, polymer), and the like.

Figure 21:
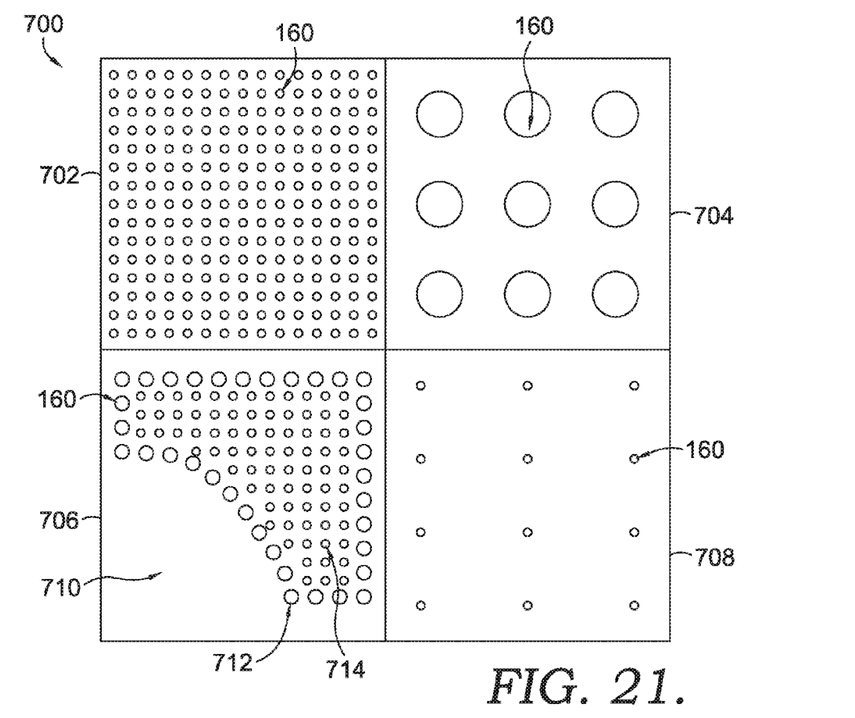
FIG. 21 depicts a bottom view of an exemplary plate comprised of four plate portions having different aperture configurations, in accordance with aspects of the present invention.

FIG. 21 depicts a bottom view of an exemplary plate 700 comprised of four plate portions (702, 704, 706, and 708) each having different aperture configurations, in accordance with aspects of the present invention. The first plate portion 702 is formed with a first aperture pattern comprised of a plurality of relatively similar-sized smaller apertures 160 in a uniform pattern. The second plate portion 704 is comprised of a plurality of similar-sized larger apertures in a uniform pattern. The third plate 706 is comprised of a variety of apertures in a non-uniform pattern. The fourth plate portion 708 is comprised of a plurality of similar-sized small apertures with a uniform, but dispersed, pattern.

Plate portions having different aperture patterns are able to be combined in a variety of manners to achieve zoned material manipulation functionality. For example, if a portion of material to be manipulated has a low porosity and light weight, the aperture pattern in the fourth plate portion 708 may be used to reduce an amount of vacuum energy necessary to manipulate the material. However, if a delicate and flexible material is in need of being manipulated, the aperture pattern in the first plate portion 702 may be utilized to provide a distributed vacuum force with smaller points of vacuum application. Further, if an irregular-shaped material portion is to be manipulated, the aperture pattern of the fourth plate portion 708 may be appropriate.

The aperture pattern of the fourth plate portion 708 is comprised of a non-aperture portion 710. The non-aperture portion 710 may be formed into a plate where material is absent or where vacuum forces are not intended to be applied. For example, to prevent having apertures not in contact with material to be manipulated, which may reduce a level vacuum force exerted as a result of uncovered apertures, the non-aperture portion may be formed in the plate at known location where there will be an absence of material.

Further, it is contemplated that apertures of various sizes may be formed into portions of the plate. For example, a first aperture size 712 may form a first portion, such as a perimeter region. A second aperture size 714 may form a second portion, such as an internal area. The size and spacing (and shape) of the apertures may be adjusted based on a product to be manipulated. As such, it is contemplated the one plate portion may be switched, utilizing the removable coupling functionality, with another plate portion. Therefore, it is contemplated that one or more portions of a plate may be maintained while selectively switching one or more other plate portions of the plate.

Exemplary aspects are provided herein for illustrative purposes. Additional extensions/aspects are also contemplated in connection with aspects of the present invention. For example, a number, size, orientation, and/or form of components, portions, and/or attributes are contemplated within the scope of aspects of the present invention.

What is claimed is:

1. A pickup tool comprising:
    a plurality of vacuum distributors forming a plurality of respective vacuum distribution cavities;
    a plurality of vacuum generators, each of the plurality of vacuum generators coupled to a respective one of the plurality of vacuum distributors; and
    a plate comprising a plurality of plate portions, each of the plurality of plate portions corresponding to a respective one of the plurality of vacuum distributors, wherein the pickup tool is configured to allow selective activation and deactivation of pickup force in each of the plurality of plate portions.

2. The pickup tool of claim 1, wherein the selectively activated and deactivated pickup force in each of the plurality of plate portions is a vacuum force.

3. The pickup tool of claim 2,
    wherein each of the plurality of vacuum distributors comprises an interior top surface, an exterior top surface, an interior side surface, and an exterior side surface, wherein the plate comprises an interior plate surface and an exterior plate surface, and wherein the exterior plate surface is rigid and non-compressible.

4. The pickup tool of claim 2, wherein the plurality of vacuum generators are independently operable such that each of the plurality of vacuum distributors can produce an independent vacuum force.

5. The pickup tool of claim 2, wherein the plurality of vacuum generators are remotely located from the plurality of vacuum distributors.

6. The pickup tool of claim 5, wherein the remotely located plurality of vacuum generators are fluidly coupled to the plurality of vacuum distributors with piping.

7. The pickup tool of claim 2, wherein each vacuum generator of the plurality of vacuum generators comprises a mechanical vacuum or a vacuum pump.

8. The pickup tool of claim 2, wherein each plate portion of the plurality of plate portions is coupled to at least one other plate portion of the plurality of plate portions at one or more junctions.

9. The pickup tool of claim 2, wherein the plurality of vacuum distributors are rigidly coupled.

10. The pickup tool of claim 2, wherein the plurality of plate portions are removably coupled to each other.

11. The pickup tool of claim 2, wherein:
the plurality of vacuum distributors comprises 8 vacuum distributors,
the plurality of plate portions comprises 8 plate portions, and
the plurality of vacuum generators comprises 8 vacuum generators.

12. The pickup tool of claim 2, further comprising an ultrasonic welder.

13. A vacuum tool comprising:
a plurality of vacuum distributors forming a plurality of respective vacuum distribution cavities;
a plurality of vacuum generators, each of the plurality of vacuum generators coupled to a respective one of the plurality of vacuum distributors; and
at least one plate coupled to the plurality of vacuum distributors,
wherein the at least one plate includes at least one aperture associated with each of the plurality of vacuum distributors, the at least one aperture for each of the plurality of vacuum distributors extending through the at least one plate, and
wherein the vacuum tool is configured to allow selective activation and deactivation of vacuum force through the at least one aperture associated with each of the plurality of vacuum distributors.

14. The vacuum tool of claim 13, wherein the at least one plate comprises a multi-portion plate comprising a plurality of plate portions that are discrete, coplanar, and coupled to each other.

15. The vacuum tool of claim 13, wherein the at least one plate is removably coupled to the plurality of vacuum distributors.

16. The vacuum tool of claim 13, wherein the plurality of vacuum generators are operable to selectively activate or deactivate vacuum force in the respective plurality of vacuum distributors separately from each other.

17. The vacuum tool of claim 13, further comprising an ultrasonic welder.

18. A vacuum tool comprising:
a first vacuum distributor having a first vacuum distribution cavity;
a second vacuum distributor having a second vacuum distribution cavity;
a first vacuum generator coupled to the first vacuum distributor;
a second vacuum generator coupled to the second vacuum distributor; and
a plate coupled to the first vacuum distributor and the second vacuum distributor, the plate comprising a first discrete coplanar portion proximate the first vacuum distributor and a second discrete coplanar portion proximate the second vacuum distributor, the first and second discrete coplanar portions each including at least one aperture extending therethrough,
wherein the first vacuum generator is configured to produce a first vacuum force in the first vacuum distribution cavity that is applied through the at least one aperture of the first discrete coplanar portion,
wherein the second vacuum generator is configured to generate a second vacuum force in the second vacuum distribution cavity that is applied through the at least one aperture of the second discrete coplanar portion, and
wherein the vacuum tool is configured to allow selective activation and deactivation of vacuum force through the first discrete coplanar portion and the second discrete coplanar portion.

19. The vacuum tool of claim 18, wherein the first and second vacuum generators are remotely located from the respective first and second vacuum distributors and fluidly coupled to the respective first and second vacuum distributors with piping.

20. The vacuum tool of claim 18, wherein the plate is removably coupled to the first and second vacuum distributors.

* * * * *